US012735302B2

(12) United States Patent
Gonsholt et al.

(10) Patent No.: US 12,735,302 B2
(45) Date of Patent: Sep. 15, 2026

(54) HEAVE COMPENSATOR ENABLING ACTIVE HEAVE COUNTERACTION

(71) Applicant: Ernst-B. Johansen AS, Stathelle (NO)

(72) Inventors: Sondre Vågsland Gonsholt, Skien (NO); Espen Boseth Johansen, Stathelle (NO); Kristian Helland, Stathelle (NO)

(73) Assignee: Ernst-B. Johansen AS, Stathelle (NO)

( * ) Notice: Subject to any disclaimer, the term of this patent is extended or adjusted under 35 U.S.C. 154(b) by 657 days.

(21) Appl. No.: 18/321,523

(22) Filed: May 22, 2023

(65) Prior Publication Data

US 2023/0382692 A1 Nov. 30, 2023

(30) Foreign Application Priority Data

May 25, 2022 (EP) .................................... 22175514

(51) Int. Cl.

| | |
|---|---|
| ***B66C 13/02*** | (2006.01) |
| ***B66C 13/20*** | (2006.01) |
| *B66C 13/10* | (2006.01) |
| *E21B 19/00* | (2006.01) |
| *E21B 19/09* | (2006.01) |

(52) U.S. Cl.

CPC .............. *B66C 13/02* (2013.01); *B66C 13/20* (2013.01); *B66C 13/105* (2013.01); *E21B 19/006* (2013.01); *E21B 19/09* (2013.01)

(58) Field of Classification Search

CPC ....... B66C 13/02; B66C 13/105; B66C 13/20; B66C 13/04; B66C 23/52; E21B 19/006; E21B 19/09; F15B 1/02

See application file for complete search history.

(56) References Cited

U.S. PATENT DOCUMENTS 3,721,293 A 3/1973 Ahlstone et al.
3,912,227 A * 10/1975 Meeker ................ F15B 21/087 254/277

(Continued)

FOREIGN PATENT DOCUMENTS

GB 2 001 035 A 1/1979

OTHER PUBLICATIONS

Extended European Search Report issued in counterpart European Patent Application No. 22175514.3, mailed on Nov. 22, 2022 (7 pages).

*Primary Examiner* — Dustin T Nguyen

(74) *Attorney, Agent, or Firm* — Osha Bergman Watanabe & Burton LLP

(57) ABSTRACT

A heave compensator includes a main hydraulic cylinder including a first connection device located at an upper end of the main hydraulic cylinder and a first piston having a piston rod. The interior of the main hydraulic cylinder is divided by the first piston into an upper first chamber and a lower second chamber filled with hydraulic liquid. The piston rod has a second connection device located at a lower end of the piston rod. The heave compensator includes a lifting accumulator comprising a second piston dividing the interior of the lifting accumulator into a third chamber filled with gas and a fourth chamber filled with hydraulic liquid. The fourth chamber is fluidly connected to the second chamber by a first liquid conduit having a first actuator controlled valve regulating the flow of hydraulic liquid in the first liquid conduit. The heave compensator includes a lowering accumulator comprising a third piston dividing the interior of the lowering accumulator into a fifth chamber filled with gas and a sixth chamber filled with hydraulic liquid. The sixth chamber is fluidly connected to the second chamber by a second liquid conduit having a second actuator controlled valve regulating the flow of hydraulic liquid in the second conduit. The sixth chamber is fluidly connected (Continued)

to the fourth chamber by a third hydraulic liquid conduit comprising an actuator controlled pump unidirectionally regulating the flow of hydraulic liquid from the sixth chamber to the fourth chamber. The heave compensator further includes a sensor kit including a motion sensing unit registering the vertical movements of the main hydraulic cylinder, a logical controller unit including a processor loaded with a Valve Regulation Module containing logic commands which when executed controls and regulates the actuator of the first actuator controlled valve, the actuator of the second actuator controlled valve, and the actuator of the actuator controlled pump, and signal transferring lines electronically connecting the logic controller unit to the motion sensing unit of the sensor kit, the actuators of the first and the second actuator controlled valves, and the actuator of the actuator controlled pump.

15 Claims, 8 Drawing Sheets

(56) References Cited

U.S. PATENT DOCUMENTS

| | | | | |
|---|---|---|---|---|
| 4,351,261 | A * | 9/1982 | Shanks | B63B 35/44<br>92/143 |
| 9,718,652 | B2 * | 8/2017 | Cannell | B66C 23/53 |
| 9,919,902 | B2 * | 3/2018 | Bergem | B66D 1/52 |
| 10,099,752 | B2 * | 10/2018 | Roodenburg | E21B 19/006 |
| 11,111,113 | B2 * | 9/2021 | Martinsen | B66C 13/04 |
| 2018/0016120 | A1 * | 1/2018 | Bergem | B66C 23/52 |
| 2019/0047830 | A1 | 2/2019 | Martinsen | |

* cited by examiner

HEAVE COMPENSATOR ENABLING ACTIVE HEAVE COUNTERACTION

FIELD OF TECHNOLOGY

The present invention relates to a heave compensator which enables active counteraction of heave movements on a load and/or a quick-lift of a load.

BACKGROUND

Offshore installations, such as offshore wind turbines, various process modules for subsea oil and gas exploration etc., are in many cases deployed by being transported on seagoing transport vessels out to the placement location, and thereafter lifted off the transport vessel by an on-board crane or crane located on another vessel, on land or a jacked up offshore structure and then lowered onto an offshore structure or into the sea, either to be located on the surface as a floating or static installation or lowered into the water to be installed on the sea floor or on a subsea structure.

The deployment, more precise, the lifting operation is sensitive to the weather conditions since, during suspended loads offshore, sea induced movements of the vessel will quickly become problematic since the movements of the vessel and thereby the crane results in variations in the position of the suspended load, the available lifting height between the sea surface and the crane's point of suspension, and because the cyclic wave movements results in periodic accelerated movements of the suspended load.

This is particularly problematic for lifting of heavy cargoes and/or huge structures, since the accelerated movements of the suspended load induces huge tension forces/strains on the crane and suspension points in the load and danger of high impact landing, re-contact between the load and the transport vessel or the landing point etc., which may damage the suspended load.

Thus, to avoid costly non-productive time waiting for improved wave conditions allowing such deploying operations, it is a desire to be able to amend these wave-induced problems, allowing performing the deployment in less favourable weather conditions. The reduction in costs, due to saved waiting times, increases with increased "weather window". It is thus a need for compensating the variation in available lifting height between the point of suspension of the crane and the landing point or the surface of the sea, caused by wave induced movements of the lifting vessel, to avoid detrimental tension forces on the crane or the suspended load, or detrimental contact forces on the load following high landing speed and re-contact between the load and the landing point or vessel.

PRIOR ART

It is known to apply a heave compensator in offshore lifting operations to reduce unintended movements of the load being lifted if the crane/crane vessel becomes affected by waves/rough sea. The heave compensating mechanism/device may be made integral with the lifting crane/device or may be a separate unit being suspended between the crane and the load. The latter is sometimes denoted as an in-line heave compensator.

The objective of a heave compensation system/heave compensator is to counteract any unintended movement of the load (lifted object) relative to the seabed or to a fixed installation, or to align the movement of the load to the movement of a floating vessel or installation. These systems/compensators can be active, passive, or a combination of both.

An in-line heave compensator typically obtains the heave compensation effect (on the load) by extending itself to a longer length when a heave movement raises the crane tip and vice versa, compresses itself to a shorter length when a heave movement lowers the crane tip and thus reduces the heave movements effect on the suspended load.

A passive heave compensation system (PHC) reacts on externally applied forces (e.g. drag and inertial forces exerted on the lifted load), which displaces a spring mechanism from its equilibrium position and sets up a counteracting force on the load effectively reducing its movement. The efficiency of a PHC system relies on the presence of externally applied forced, typically a large projected horizontal area which induces hydrodynamic forces subsea. When lifting small objects subsea, or any object in air, these forces are absent or limited, and this constitutes a key limitation related to PHC systems.

An example of a heave compensator intended to be suspended between the load and the lifting device and which has a passive heave compensation is known from e.g. patent document US 2018/016120. This heave compensator applies a centre cylinder having a piston with a hook for attaching the load. The centre cylinder is attached to the crane hook. The piston hook forms a heave compensating hook for the load by adjusting the distance between the crane hook and the heave compensating hook in response to the heave movements. The counteracting spring effect on the piston is obtained by having the oil side of the centre cylinder being fluidly connected to the oil side of one or more oil/gas accumulators. In this specific example of a PHC, it is applied two or more oil/gas accumulators preloaded with different amounts of gas to obtain a relatively stiff stroke response at small to moderate stroke lengths and then a softer stroke response at larger stroke lengths to avoid exceeding the dynamical amplification factor (DAF)-limitations of the crane/lifting device or on the load.

Active heave compensation systems (AHC) generates the force necessary to set up the counteracting force on the load by one or more actuators and are thus in need for a relatively huge supply of external power to run the actuator(s). Traditionally, AHC systems are made an integral part of an offshore crane or a winch, controlling the movement of the hook relative to the crane tip or "rope exit point". The heave compensation is executed by either controlling the winch directly or manipulating the wire length by means of an arrangement of actuator and sheaves. There are also known solutions for compensating the heave motion by moving the rope exit point, relative to the pedestal, e.g. a "nodding boom".

There are several challenges related to integrated AHC systems:

1) Reduced service life—During AHC operation a short segment of the wire of wire is repeatedly running over sheaves, causing bending stress, friction, heat generation. This combination will wear out the wire, requiring more frequent wire replacement and service
2) Energy demanding—AHC cranes requires a huge amount of energy to operate in AHC mode, because the work is performed on the full weight of the lifted load.
3) Capital intensive—Implementing AHC in crane is a large investment, and the AHC system will be permanent and stationary.

It would be advantageous, for the above given reasons, to have a hook mounted active heave compensation such as suggested in e.g. document GB 2 001 035. The document discloses a hook mounted heave compensator comprising a cylinder and piston assembly where cylinder is attached to the crane hook and the piston forms a compensated hook attached to the load. The heave compensating effect is obtained by adjusting the distance between the crane hook and the compensated hook by using a hydraulic pump pumping oil in or out of the cylinder to move the piston relative to the cylinder. In this arrangement, the energy need to run the hydraulic pump becomes rather heavy because the pump needs to work against the full weight of the load.

Document US 2019/047830 discloses a hook mounted hybrid heave compensator having a centre cylinder with a piston forming a heave compensating hook for the load. The heave compensator further comprises at least one oil/gas accumulator having its oil side fluidly connected to the oil side of the centre cylinder to set up a passive spring effect. A hydraulic pump is arranged in the fluid line between the oil side of the centre cylinder and the at least one oil/gas accumulator which actively enforces the passive heave compensation effect obtained by the oil/gas accumulator(s) to obtain a complete or near complete compensation of the heave movements. Since the passive heave compensation effect of the oil/gas accumulator(s) balances much of the weight of the load, the energy needed to run the hydraulic pump becomes significantly less as compared to "pure" active heave compensators which need to actively work against the full weight of the load. However, the need for external energy is still significant.

OBJECTIVE OF THE INVENTION

The objective of the invention is to provide a heave compensator.

A further objective of the invention is the provision of a method for actively counteracting the effect of heave movements on a suspended load including a quick-lift function.

Another objective of the invention is the provision of a method for obtaining a quick-lift.

DESCRIPTION OF THE INVENTION

The present invention obtains an active counteraction of heave movements by utilising the energy of at least one storage of highly pressurised gas when counteracting a downwardly directed heave movement and utilising the (lesser) energy of at least one storage of relatively low pressurised gas when counteracting an upwardly directed heave movement, and utilises fluid connection between the gas stores and a pump to restore/maintain the required storages of highly pressurised gas and relatively low pressurised gas, respectively.

This, in a first aspect the present invention relates to a heave compensator, comprising:

a main hydraulic cylinder (1) comprising a first connection device (5) located at an upper end of the main hydraulic cylinder and a first piston (2) having a piston rod (6), where the interior of the main hydraulic cylinder (1) is divided by the first piston (2) into an upper first chamber (3) and a lower second chamber (4) filled with hydraulic liquid, and where the piston rod (6) has a second connection device (7) located at a lower end of the piston rod (6), a lifting accumulator (10) comprising a second piston (11) dividing the interior of the lifting accumulator (10) into a third chamber (12) filled with gas and a fourth chamber (13) filled with hydraulic liquid, wherein the fourth chamber (13) is fluidly connected to the second chamber (4) by a first liquid conduit (30) having a first actuator controlled valve (31) regulating the flow of hydraulic liquid in the first liquid conduit (30), a lowering accumulator (20) comprising a third piston (21) dividing the interior of the lowering accumulator (20) into a fifth chamber (22) filled with gas and a sixth chamber (23) filled with hydraulic liquid, wherein the sixth chamber (23) is fluidly connected to the second chamber (4) by a second liquid conduit (32) having a second actuator controlled valve (33) regulating the flow of hydraulic liquid in the second conduit (32), characterised in that the sixth chamber (23) is fluidly connected to the fourth chamber (13) by a third hydraulic liquid conduit (40) comprising an actuator controlled pump (41) unidirectionally regulating the flow of hydraulic liquid from the sixth chamber (23) to the fourth chamber (13), and in that the heave compensator further comprises:

a sensor kit comprising a motion sensing unit (51) registering the vertical movements of the main hydraulic cylinder (1), a logical controller unit (50) comprising a processor loaded with a Valve Regulation Module containing logic commands which when executed controls and regulates the actuator of the first actuator controlled valve (31), the actuator of the second actuator controlled valve (33), and the actuator of the actuator controlled pump (41), and signal transferring lines (52) electronically connecting the logical controller unit (50) to the motion sensing unit (51) of the sensor kit, the actuators of the first (31) and the second (32) actuator controlled valves, and the actuator of the actuator controlled pump (41).

The term "first connection device" as used herein encompasses any known and conceivable mean to releasably attaching the main hydraulic cylinder 1 of the heave compensator to a lifting wire of a lifting device, and likewise, the term "second connection device" as used herein encompasses any known and conceivable mean to releasably attaching the attaching piston rod 6 of the main hydraulic cylinder 1 to a load to be lifted.

The term "logic control unit" as applied herein, encompasses any known and conceivable control unit able to engage the actuator of the first 31 or the second 33 actuator controlled valve and regulate the throughflow of hydraulic liquid in one or both of the first liquid conduit 30 and the second liquid conduit 32, respectively, and furthermore, to be able to engage and regulate the action of the pump 41 of the third liquid conduit 40. Examples of suited logic control unit includes but is not limited to; a Proportional-Integral-Derivative (PID) controller, a feed-forward (open loop) controller, a fuzzy logical controller, a process-model based controller, or combinations thereof.

The term "motion sensing unit" as used herein encompasses any known and conceivable acceleration sensing unit. An example of a commonly applied motion sensing unit is the "motion reference unit" (MRU), which is an inertial measurement unit with single- or multi-axis Micro-Electro-Mechanical Systems (MEMS) gyroscope based motion sensors. By mounting the MRU at the crane tip or on the main hydraulic cylinder, such MRUs may be used to determine the vertically oriented motion of the heave compensator.

The term "actuator controlled valve" as used herein encompasses any known and conceivable valve able to shut-off and opening a conduit from zero to full throughflow of fluid in the conduit. The valve may advantageously e.g. be a throttle valve, a dampening valve, a proportional valve, or of any other type of valve which may continuously regulate the cross-section of the liquid conduit from zero to 100% opening by engaging its actuator. The actuator may advantageously be electrically driven.

The term "actuator controlled pump" as used herein encompasses any known and conceivable pump able to pump hydraulic liquid from the sixth chamber 23 of the lowering accumulator 20 through the third liquid conduit 40 and into the fourth chamber 13 of the lifting accumulator 10. The actuator of the hydraulic pump may advantageously be an electric motor. In one embodiment, the pump may comprise a backflow block valve to safeguard that the hydraulic liquid can only flow unidirectionally through the third liquid conduit 40 from the sixth 23 to the fourth 13 chamber.

The term "liquid conduit" as used herein encompasses any known and conceivable means for transporting a relatively highly pressurised liquid. Examples include but is not restricted to hydraulic steel pipes, enforced rubber hoses, copper tubes etc. The hydraulic liquid may advantageously be a hydraulic oil or a glycol based liquid such as e.g., the liquid sold under the trade mark Houghto-Safe NL1; however, the present invention may apply any non-compressible liquid with sufficient low freezing point and correspondingly high boiling point to avoid phase transformations at the pressures and temperatures that may arise in heave compensators.

In one embodiment, the third chamber 12 of the lifting accumulator 10 may be preloaded with an amount of gas giving a set point pressure, $sp_2$, which ensures that the gas pressure inside the third chamber 12 is larger than $p_1$ for any position of the second piston 11, and the fifth chamber 22 of the lowering accumulator 20 may be preloaded with an amount of gas giving a set point pressure, $sp_3$, which ensures that the gas pressure inside the fifth chamber 22 is smaller than $p_1$ for any position of the third piston 21, where $p_1$ is the load induced hydrostatic pressure of the hydraulic liquid in chamber 4 when a load intended to be lifted is suspended from the second connection device 7.

The term "preloaded with an amount of gas giving a set point pressure, $sp_2$, which ensures that the gas pressure inside the third chamber 12 always is larger than $p_1$ at any position of the second piston 11" as used herein, relates to the fact that the actual gas pressure, $p_2$, in the third chamber 12 of the lifting accumulator 10 varies with the volume of the chamber, i.e. the position of the second piston 11, such that always higher means that no matter which position the second piston has inside the lifting accumulator. The same applies mutatis mutandis to the term "preloaded with an amount of gas giving a set point pressure, $sp_3$, which ensures that the gas pressure inside the fifth chamber 22 always is smaller than $p_1$".

Since the load induced hydrostatic pressure, $p_1$, is depended on the mass of the load to be lifted, the pre-loading of gas, typically nitrogen, should be adapted to the weight of the load to be lifted. The determination of amount of gas to be pre-loaded in gas/hydraulic liquid accumulators of heave compensators relative to the mass of a load to be lifted is standard procedure well known to the skilled person.

In the case of applying a relatively high gas pressure in the third chamber 12, it is enabled transferring hydraulic liquid from the lifting accumulator 10 to the main hydraulic cylinder 1 by closing the second liquid conduit 32 and opening the first liquid conduit 30 causing the piston 2 of the main hydraulic cylinder 1 to make a return stroke and thus shortening the vertical length of the heave compensator. A return stroke will counteract a downwardly oriented heave movement. Likewise, in the case of applying a relatively low gas pressure in the fifth chamber 22 it is enabled transferring hydraulic liquid from the main hydraulic cylinder 1 to the lowering accumulator 20 by closing the first liquid conduit 30 and opening the second liquid conduit 32 causing the piston 2 of the main hydraulic cylinder 1 to make an extension stroke which extends the vertical length of the heave compensator. An extension stroke will counteract an upwardly oriented heave movement.

In the case of applying a gas/liquid accumulator with a relatively high gas pressure to cause a return stroke and a gas/liquid accumulator with a relatively low gas pressure to cause an extension stroke, this embodiment of the heave compensator according to the invention applies energy stored in the gases of the gas/liquid accumulators to obtain an active heave compensation. There is an asymmetry in this set up in that the energy of the relatively high pressurised gas in the lifting accumulator is used to create return strokes working against the gravity (weight of the suspended load) while the relatively low pressurised gas of the lowering accumulator is applied to receive energy caused by the gravity (weight of the suspended load) creating extension strokes. Therefore, hydraulic fluid will be unidirectionally moved from the lifting accumulator 10, via the main hydraulic cylinder 1, to the lowering accumulator 20 when the heave compensator is engaged in counteracting heave movements. This may, depending of the duration of the lifting operation and degree of need for heave compensation, make it necessary to at least occasionally pumping hydraulic liquid the opposite way, i.e. from the relatively low pressurised lowering accumulator 20 to the relatively high pressurised lifting accumulator 10 to maintain the active heave compensation functionality of the heave compensator. This is obtained by pump 41 and the third liquid conduit 40.

An advantage of this arrangement is that since the net transfer of hydraulic liquid from the high pressurised lifting accumulator 10 to the lowering accumulator 20 results in that the energy of the gas phase of the former decreases while the energy of the gas phase of the latter increases, the pump 41 needs only to work against a relatively low pressure difference to restore the balance of hydraulic liquid between the lifting 10 and lowering 20 accumulators. Furthermore, since the hydraulic pump works intermittently against the pressure difference between the gas pressure of the lifting accumulator and the gas pressure of the lowering accumulator, both pressures being relatively proximate to the load induced pressure $p_1$, the need for external energy to achieve the active heave compensation by the present heave compensator becomes relatively low. Thus, in one embodiment, the heave compensator according to the invention may further comprise an electric battery for supplying the actuator driven hydraulic pump with electric energy. Alternatively, the electric energy may be supplied via one or more electric cables from an external source of electric power.

Furthermore, in one embodiment, the amount of hydraulic liquid in the heave compensator may advantageously be adapted such that when hydraulic fluid is distributed equally between the second 4, fourth 13, and the sixth 23 chamber, that the first 2, second 11, and the third 21 piston are respectively positioned in the middle of the main hydraulic cylinder 1, the lifting accumulator 10, and the lowering accumulator 20. This amount and distribution of the hydraulic liquid is advantageous for the heave compensation functionality of the heave compensator and may be regarded as a "neutral state" of the heave compensator. Furthermore, in this case, the preloaded amount of gas may advantageously be adapted to give a relatively small pressure difference $p_1$-$p_3$ and similarly a relatively small pressure difference $p_2$-$p_1$ when the first 2, second 11, and the third 21 piston are positioned in the neutral state. i.e. in the middle of the main hydraulic cylinder 1, the lifting accumulator 10, and the lowering accumulator 20, respectively. This makes the pressure difference $p_2$-$p_3$ which the hydraulic pump 41 must work against relatively small.

In one embodiment, the heave compensator according to the invention may further comprise a fourth pressure sensor 57 measuring the load induced hydrostatic pressure, $p_1$, in the hydraulic liquid in the second chamber 4. The fourth pressure sensor 57 provides the advantage of measuring and thus applying a correct load induced hydrostatic pressure in the regulation of the actuator controlled pump. In example embodiments without a fourth pressure sensor 57, it is necessary to, in advance, to estimate an expected load induced pressure $p_1$ which will arise when the load is suspended from the heave compensator.

In one embodiment, the sensor kit of the heave compensator according to the invention may further comprise a first position sensor 53 registering the position of the first piston 2 of the main hydraulic cylinder 1.

In one embodiment, the sensor kit of the heave compensator according to the invention may further comprise a first pressure and temperature sensor 54 located in and registering the gas pressure, $p_2$, inside the third chamber 12 of the lifting accumulator 10.

In one embodiment, the sensor kit of the heave compensator according to the invention may further comprise a second pressure and temperature sensor 55 located in and registering the gas pressure, $p_3$, inside the fifth chamber 22 of the lowering accumulator 20.

In one embodiment, the heave compensator according to the invention may further comprise a third pressure sensor 56 registering the ambient gas or hydrostatic pressure of the environment of the heave compensator.

In one embodiment, the heave compensator according to the invention may further comprise a second position sensor 58 registering the position of the second piston 11 inside the lifting accumulator 10.

In one embodiment, the heave compensator according to the invention may further comprise a third position sensor 59 registering the position of the third piston 21 inside the lowering accumulator 20.

In one embodiment, the Valve Regulation Module of the control unit 50 may further comprise a Heave Compensation Module containing logic commands, which when executed, utilises sensor data from the motion sensing unit 51 to determine a vertical velocity component, $v_{heave}$, of a heave movement affecting the main hydraulic cylinder 1 and further utilises sensor data from the first position sensor 53 to determine the velocity, $v_{pist1}$, of the piston 2 of the main hydraulic cylinder 1, and then engages the actuator of the first actuator controlled valve 31 and the actuator of the second actuator controlled valve 33 to regulate the movement of the first piston 2 of the main hydraulic cylinder such as to satisfy the relation: $|v_{heave}+v_{pist1}|=0$. The regulation of the movement of the first piston 2 of the main hydraulic cylinder to satisfy the relation, $|V_{heave}+v_{pist1}|=0$, may be obtained by adjusting the opening of the respective actuator controlled valve 31, 33 of the respective liquid conduit 30, 32 of the lowering 10 or lifting 20 accumulator being engaged to create the counter stroke and thus adjusting the volume flow rate of hydraulic liquid flowing through the conduit 30, 32 and in/out of the main hydraulic cylinder 1.

In one embodiment the program module of the control unit 50 may further comprise a Pump Activation Module containing logic commands, which when executed, applies sensor data from the second pressure and temperature sensor 55 to engage the pump 41 whenever the measured gas pressure, $p_3$, in the fifth chamber 22 becomes higher than $1.2 \cdot sp_3$, preferably higher than $1.15 \cdot sp_3$, more preferably higher than $1.1 \cdot sp_3$, and most preferably higher than $1.05 \cdot sp_3$, and to disengage the pump 41 whenever the measured gas pressure in the fifth chamber 22 becomes lower than $0.8 \cdot sp_3$, preferably lower than $0.85 \cdot sp_3$, more preferably lower than $0.9 \cdot sp_3$, and most preferably lower than $0.95 \cdot sp_3$, where $sp_3$ is the pressure of the preloaded gas in the fifth chamber prior to a lifting operation.

In one embodiment, the program module of the control unit 50 may further comprise a Pump Activation Module containing logic commands, which when executed, applies sensor data from the first pressure and temperature sensor 54 and the second pressure and temperature sensor 55 to regulate the revolutions per minute of the pump to minimise an error function $e=\max(ep_2, ep_3, 0)$, where $ep_2=sp_2-p_2$, $ep_3=p_3-sp_3$, $sp_2$ is the pressure of the preloaded gas in the third chamber 12 prior to a lifting operation, $sp_3$ is the pressure of preloaded gas in the fifth chamber 22 prior to a lifting operation, $p_2$ is the measured gas pressure by the first pressure and temperature sensor 54 in the third chamber 12 of the lifting accumulator 10, $p_3$ is the measured gas pressure by the second pressure and temperature sensor 55 in the fifth chamber 22 of the lowering accumulator 20. The error function returns the value 0 when both $ep_2$ and $ep_3$ are negative, and then the hydraulic pump 41 is stopped.

Heave movements affecting the crane during the initial phase of a lift may cause a harmful recontact between the load and deck/ground. Thus, in one embodiment, the program module of the control unit 50 may advantageously further comprise a Quick Lift Module providing the heave compensator according to the invention with a quick-lift function which relatively rapidly lifts a load above the deck/ground in the initial phase of a lift. The term "quick-lift" as used herein refers to the combined lifting effect obtained from both the crane hoisting the load and the heave compensator making return stroke when the lifting operation commences. A quick-lift will thus simultaneously lift the load both by the crane's action and by the return stroke of the main hydraulic cylinder causing the load to be relatively rapidly lifted to a height above the deck/ground which significantly reduces the risk of a heave movement causing an unfriendly recontact between the load and the deck/ground.

When a quick-lift is to be executed, the heave compensator is prepared by being suspended between the load (located on the deck/ground) and the lifting crane's hook and then apply the crane to extend the main hydraulic cylinder (causing its piston 2 with piston rod 6 to do an extension stroke). During this phase, the first valve 31 should be closed and the second valve 33 kept open such that the lowering accumulator takes up and pressurises the hydraulic fluid exiting the main hydraulic cylinder. The pressurisation of the hydraulic fluid by the lowering accumulator is insufficient to lift the load off the deck/ground (since $p_3<p_1$) but sufficient to make an effective tension of the wire and slings to avoid snap-loads when the quick lift commences.

To obtain maximum lifting height by the return stroke, the heave compensator may advantageously be stretched to the maximum extension length of the first piston 2 of the main hydraulic cylinder. The lowering accumulator should thus contain a relatively small volume of hydraulic fluid to accommodate all fluid being expelled from the main hydraulic cylinder and the second valve 33 should stay open during this preparation stage up to the moment when the quick-lift is to be commenced and then be closed just before the quick-lift is commenced. Thus, in one embodiment, the Quick Lift Module comprises logic commands, which when executed, causes the Valve Regulation Module to initially keep the first valve 31 closed to preserve the high-pressurised hydraulic liquid in the lifting accumulator 10 and the second valve 33 open to enable the lowering accumulator to take-up the hydraulic liquid exiting the main hydraulic cylinder 1 and tension the wire and slings.

To achieve maximum quick-lifting effect, i.e. a maximum length return stroke of the first piston 2 during the quick-lift, the heave compensator may advantageously be prepared in advance by being preloading with a relative high volume of hydraulic liquid to enable the lifting accumulator to supply sufficient volume of high pressurised hydraulic liquid to the main hydraulic cylinder to create a maximum return stroke of its piston 2.

The Quick Lift Module may in one embodiment advantageously comprise further logic commands, which when executed, determines the volume of relatively high-pressurised hydraulic liquid present in the lifting accumulator, and eventually engages the pump 41 to transfer hydraulic liquid from the lowering accumulator to the lifting accumulator to ensure a sufficient supply of relatively high-pressurised hydraulic liquid to execute a maximum return stroke. Thus, in one embodiment, the Quick Lift Module may further comprise logic commands, which when executed causes the Valve Regulation Module to automatically preparing the heave compensator for a quick-lift by, in successive order:

- closing, if open, the first valve 31 and opening the second valve 33,
- applying the registered temperature and pressure data from the first pressure and temperature sensor 54 and/or position data from the second position sensor 58 to determine a measured volume, $V_{meas}$, of hydraulic liquid present in the lifting accumulator 10, and if $V_{meas}<V_{int}$, where $V_{int}$ is a desired initial volume of hydraulic fluid in the lifting accumulator 10:

- engaging pump 41 to transfer hydraulic fluid from the sixth chamber 23 of the lowering accumulator 20 to the fourth chamber 13 of the lifting accumulator, and
- applying the registered position data from the second position sensor 58 to disengage the pump 41 when $V_{meas} \geq V_{int}$, or else:

- close the second valve 33, and then, when the quick-lift is to be executed:

- fully opening the first valve 31 to create a free passage for the relatively highly pressurised hydraulic liquid in the lifting accumulator 10 to flow into the main hydraulic cylinder 1 and thus creates a return stroke of the first piston 2 with piston rod 6 which lifts the load off the deck/ground.

The Quick Lift Module may in one embodiment be activated by operator controlled signals, for example a Preparation Signal and a Lifting Signal. The Preparation Signal may e.g. cause the logical control unit to engage the Quick Lift Module and the Valve Regulation Module to close (if open) the first valve 31 and open (if closed) the second valve 33 and eventually engage pump 41 to preload the lifting accumulator with a sufficient volume of hydraulic fluid to enable an effective return stroke. The Lifting Signal may e.g. cause the logical control unit to engage the Quick Lift Module and the Valve Regulation Module to close the second valve 33 and then open the first valve 31 to cause the return stroke. Thus, the Preparation Signal may preferably be sent by the operator when the heave compensator is suspended between the crane and load and the crane is made ready extend the heave compensator to tension the wire and slings, while the Lifting Signal may typically be sent as soon as the crane commences the lifting of the load.

Some lifting operations have no need for heave compensation but may suffice with the quick lift function to ensure a safe uplift. In such cases, the heave compensator according to the invention may be made ready for a next lifting operation with a quick-lift by simply sending a Preparation Signal to the logical control unit which prepares the heave compensator for a new quick-lift.

In one embodiment, the Quick Lift Module may further comprise a Prepare for Heave Compensation Module containing logic commands which, when executed performs in successive order:

- closes the first valve 31,
- applies position data from the first position sensor 53 to continuously determining the position of the first piston 2,
- opens the second valve 33 to enable the weight of the suspended load to controllably extend the first piston 2 until it reaches a position around the middle of the main hydraulic cylinder at which point the second valve 33 is closed,
- engages the Pump Activation Module to transfer hydraulic liquid from the lowering accumulator 20 to the lifting accumulator 10, and then
- engages the Heave Compensation Module.

The heave compensator is illustrated and described herein as a unit having a single main hydraulic cylinder 1, a single lifting 10 and a single lowering 20 accumulator. This is not to be interpreted in a limiting sense. Depending on the mass of the load to be lifted, the heave compensator according to the invention may alternatively apply an assembly of a number of hydraulic cylinders arranged in parallel with their piston rods mechanically interconnected to each other to form a common load attachment unit and to make each hydraulic cylinder react similarly and simultaneously towards heave movements. And likewise, the heave compensator may apply an assembly of a number of lifting accumulators and/or an assembly of a number of lowering accumulators.

LIST OF FIGURES

Figure 1:
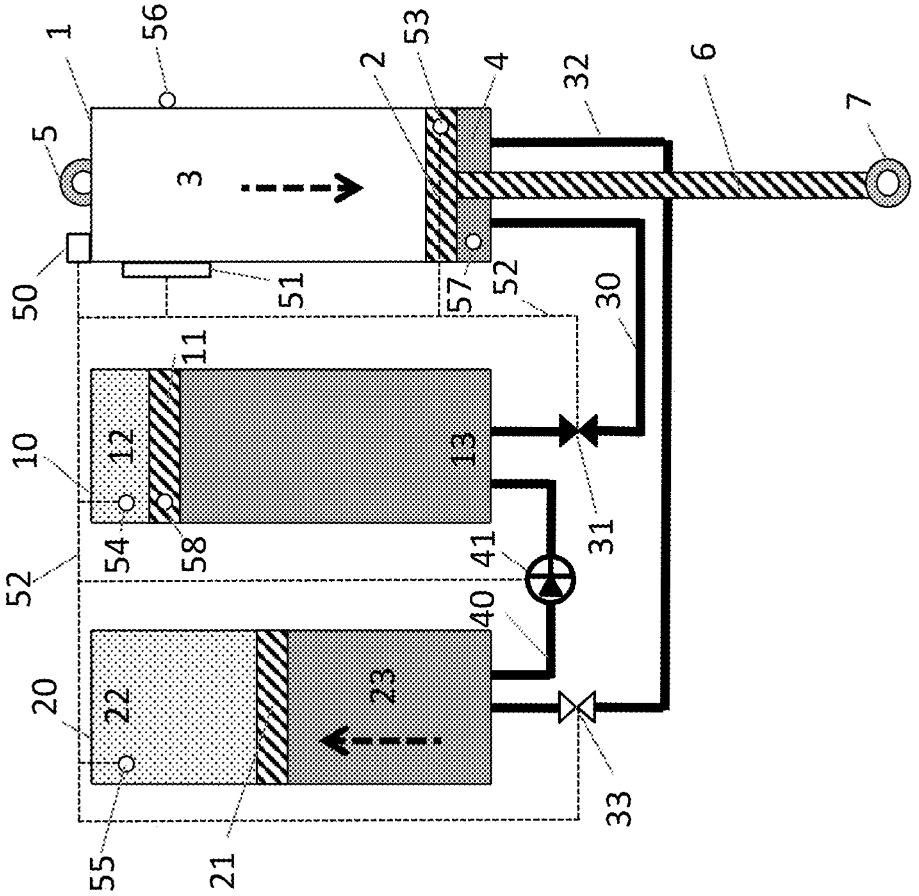
FIG. 1 is a cut-view drawing as seen from the side schematically illustrating an example embodiment of a heave compensator according to the invention being prepared for a quick-lift.
Figure 3:
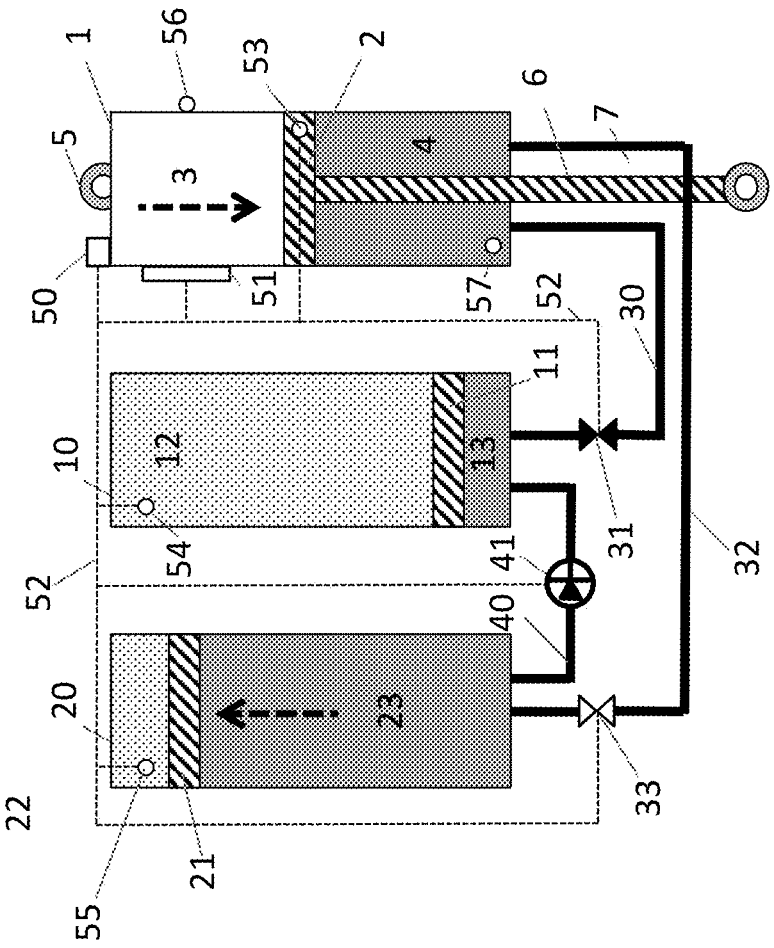
Figure 3:
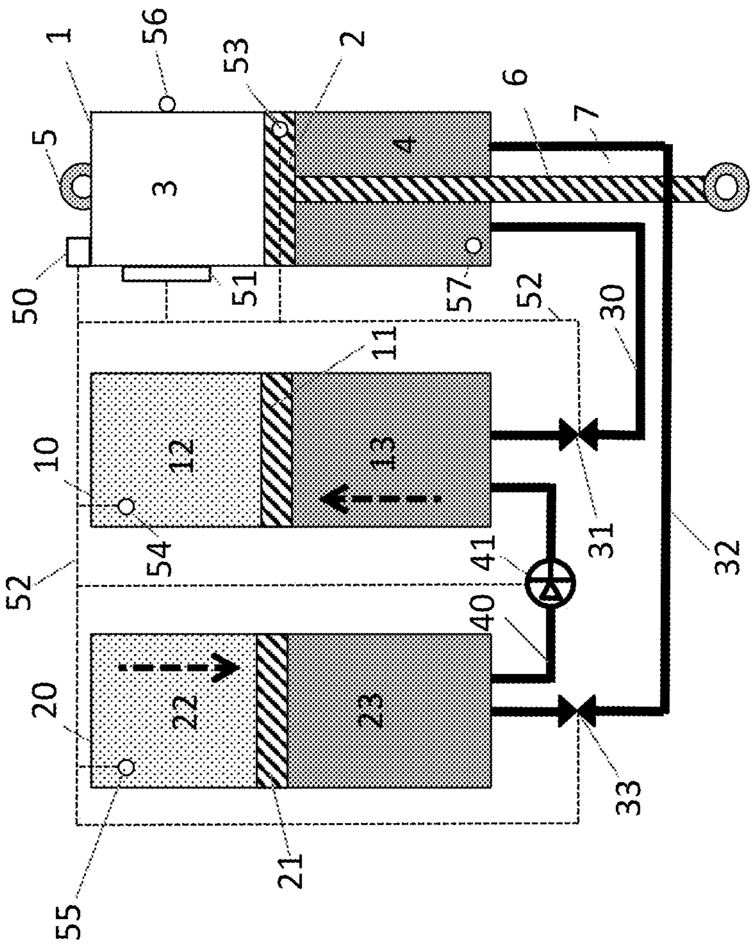

FIGS. 3 *a*) and 3 *b*) are cut-view drawings as seen from the side schematically illustrating the same example embodiment as in FIG. 1 during restoration of the balance of hydraulic liquid after execution of a quick-lift.

Figure 4:
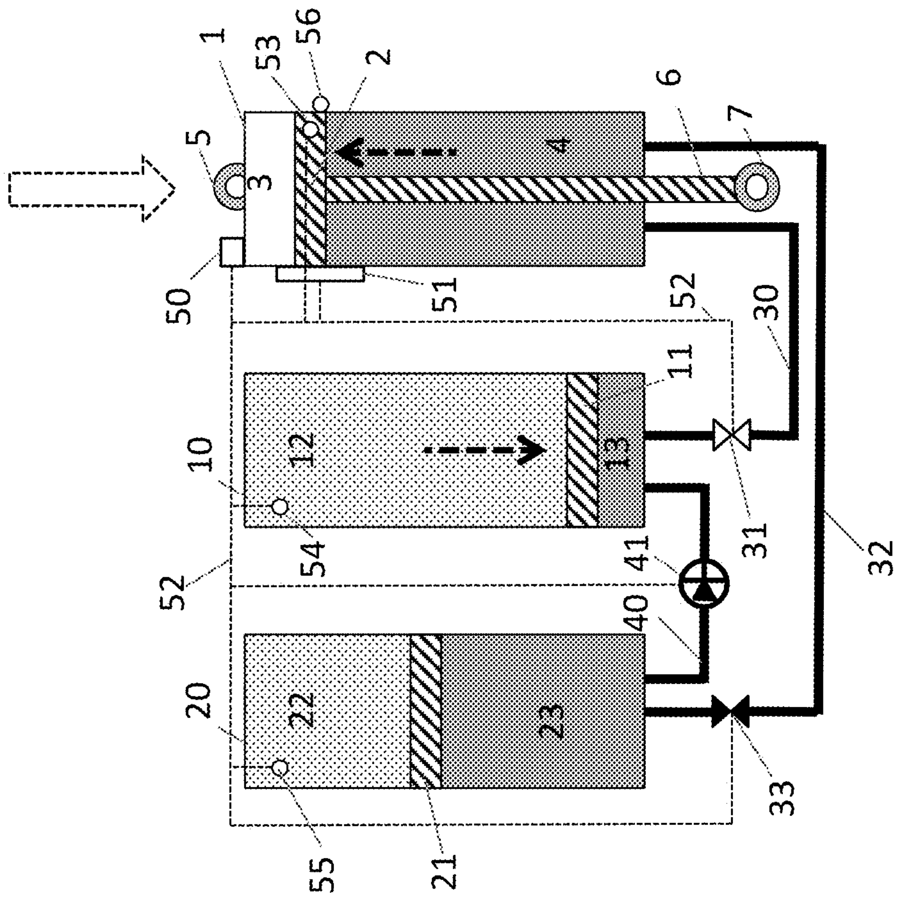
Figure 4:
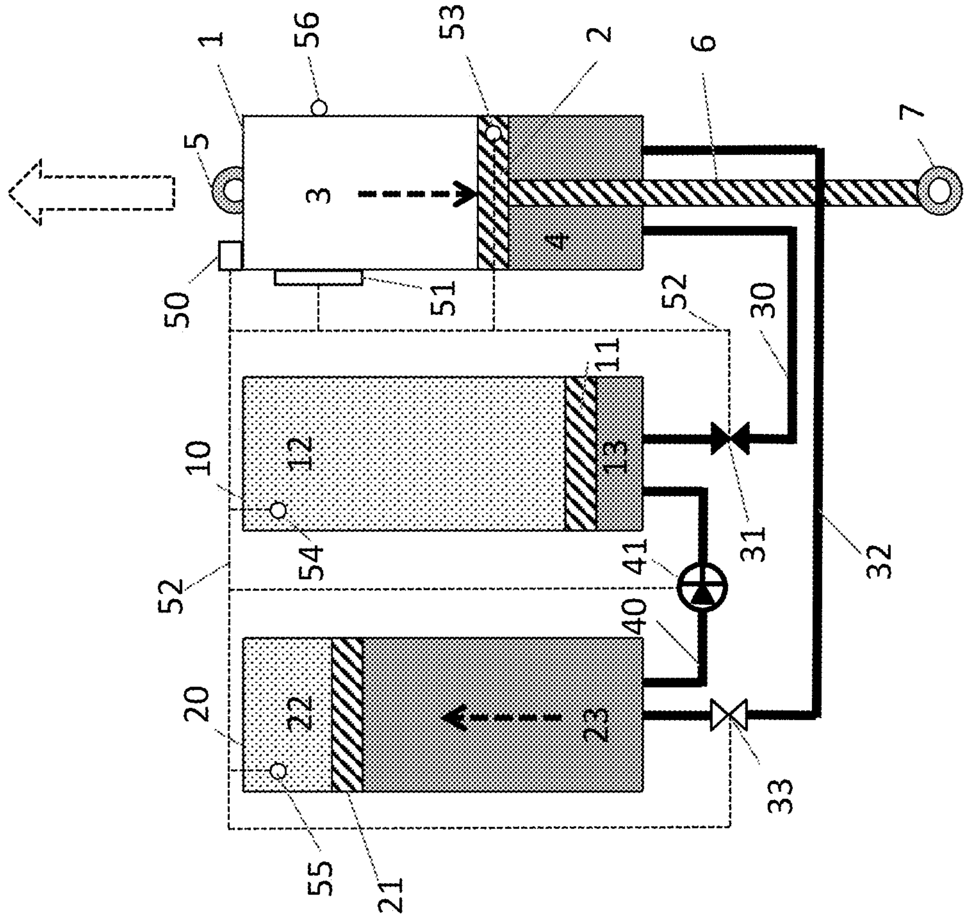
Figure 4:
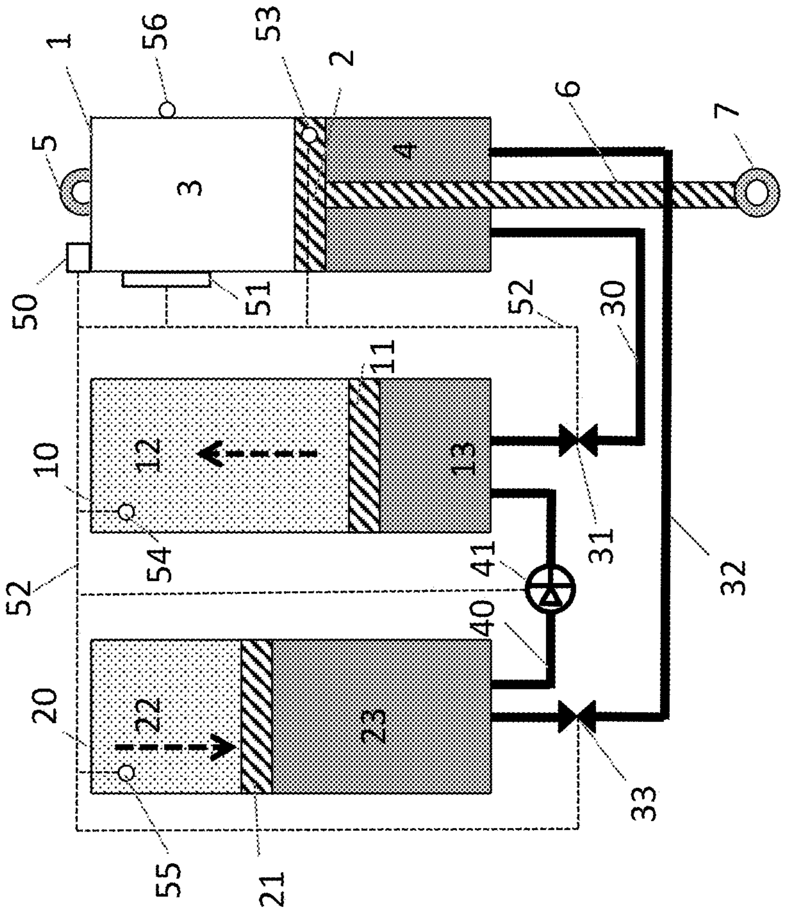

FIGS. 4 *a*) to 4 *c*) are cut-view drawings as seen from the side schematically illustrating the same example embodiment as in FIG. 1 during different stages of normal heave compensation.

Figure 5:
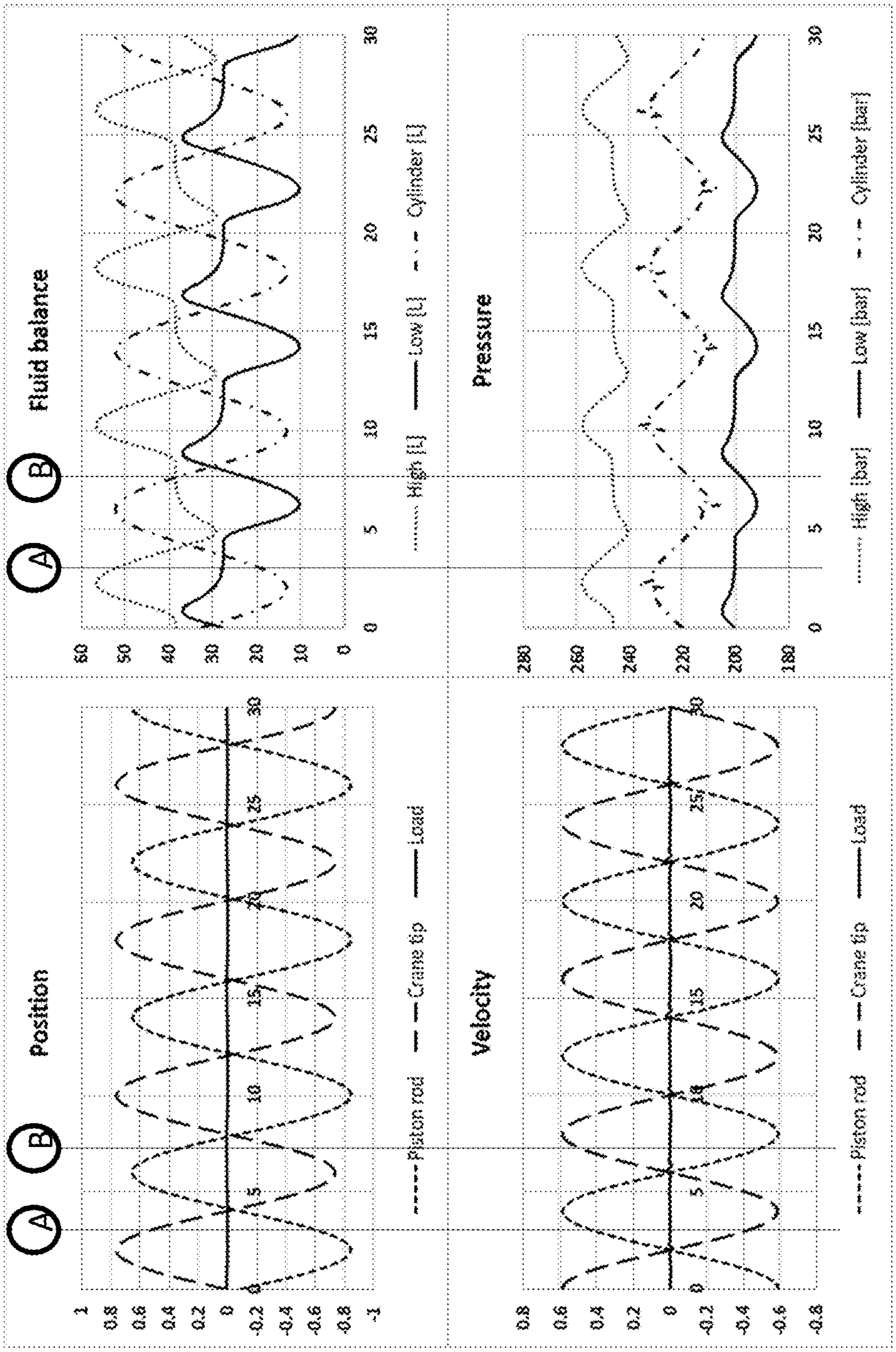

FIG. 5 displays diagrams showing calculated performance of the heave compensator according to the invention during a lift of 75 tons heavy object under heave movements of amplitude of 0.5 metres.

DETAILED DESCRIPTION OF THE INVENTION

The working principle of the heave compensator according to the invention is described illustrated by reference to FIGS. 1 to 5 which illustrates an example embodiment of the heave compensator according to the invention executing a quick-lift and then goes over to a normal heave compensation mode.

This example embodiment applies a main hydraulic cylinder 1 having a first piston 2 with a piston rod 6. The main hydraulic cylinder 1 has two inner chambers separated by the piston 2, an upper first chamber 3 filled with a relatively low pressurised gas, or preferably a vacuum, and a lower second chamber 4 filled with hydraulic liquid. The piston rod 6 extends a varying distance down from the main hydraulic cylinder and thus regulates the total length of the main hydraulic cylinder. The main hydraulic cylinder 1 will in operation be attached to a lifting wire by the first connection device 5, and a load to be lifted will be attached to the lower end of the piston rod 6 by the second connection device 7. The lifting wire and load are omitted in the figures since they are no part of the claimed invention.

The example embodiment comprises further a lifting accumulator 10 having a second piston 11 separating a gas-filled third chamber 12 and a hydraulic liquid filled fourth chamber 13, and a lowering accumulator 20 having a third piston 21 separating a gas-filled fifth chamber 22 and a hydraulic liquid filled sixth chamber 23. The hydraulic liquid filled second 4 and fourth chamber 13 are fluidly interconnected by a first hydraulic liquid conduit 30 having a first actuator-controlled valve 31 which regulates the flow of hydraulic liquid in the first liquid conduit 30. Likewise, the second 4 and the sixth chamber 23 are fluidly interconnected by a second hydraulic liquid conduit 32 having a second actuator-controlled valve 33 which regulates the flow of hydraulic liquid in the second liquid conduit 32. A third liquid conduit 40 with an actuator controlled pump 41 enables transferring hydraulic liquid from the lowering 20 to the lifting 10 accumulator. The example embodiment comprises further a motion sensing unit 51. The logical controller unit 50 of this example embodiment contains a Valve Regulation Program Module, a Heave Compensation Module, a Pump Activation Module, a Quick Lift Module, and a Prepare for Heave Compensation Module as described above, and the sensor kit comprises a first position sensor 53 registering the position of the first piston 2, a first pressure and temperature sensor 54 registering the gas pressure in the third chamber 12, a second pressure and temperature sensor 55 registering the gas pressure in the fifth chamber 22, a third pressure sensor 56 registering the ambient gas/hydrostatic pressure, a fourth pressure sensor 57 registering the hydrostatic pressure in the second chamber 4, and a second position sensor 58 registering the position of the second piston 11.

FIG. 1 illustrates a typical preparation situation before a quick-lift is commenced. The heave compensator is here suspended between the lifting wire of a crane (not shown) and the load to be lifted (not shown) and the first piston 2 of the main hydraulic cylinder 1 is moved downward by the crane lifting and stretching the main hydraulic cylinder. The hydraulic liquid exiting the second chamber 4 of the main hydraulic cylinder is passed into the lowering accumulator since the second valve 33 is open. This causes the third piston 21 to move upwards in the lowering accumulator 20 and to relatively gently tensioning the lifting wire and the slings (but without sufficient force to lift the load off its ground/basement). The movements of the first 2 and third 21 piston are indicated by the stapled arrows. Furthermore, as shown on the figure, the lifting accumulator 10 is made ready for creating a long return stroke by being loaded with a relatively huge volume of high-pressurised hydraulic liquid making it necessary to have the first valve 31 closed to contain the hydraulic fluid in the lifting accumulator 10.

In this embodiment, the heave compensator is pre-loaded with nitrogen gas such that obtains a pre-set gas pressure, $sp_3$, ensuring a gas pressure, $p_3<p_1$, in the fifth chamber 22 at any possible position of the third piston 21 and a pre-set gas pressure, $sp_2$, ensuring a gas pressure, $p_2>p_1$, in the third chamber 12 at any possible position of the second piston 11. Furthermore, the amount of hydraulic liquid in the heave compensator is adapted such that when hydraulic fluid is distributed equally between the second 4, fourth 13, and the sixth 23 chamber, that the first 2, second 11, and the third 21 piston are respectively positioned in the middle of the main hydraulic cylinder 1, the lifting accumulator 10, and the lowering accumulator 20.

Figure 2:
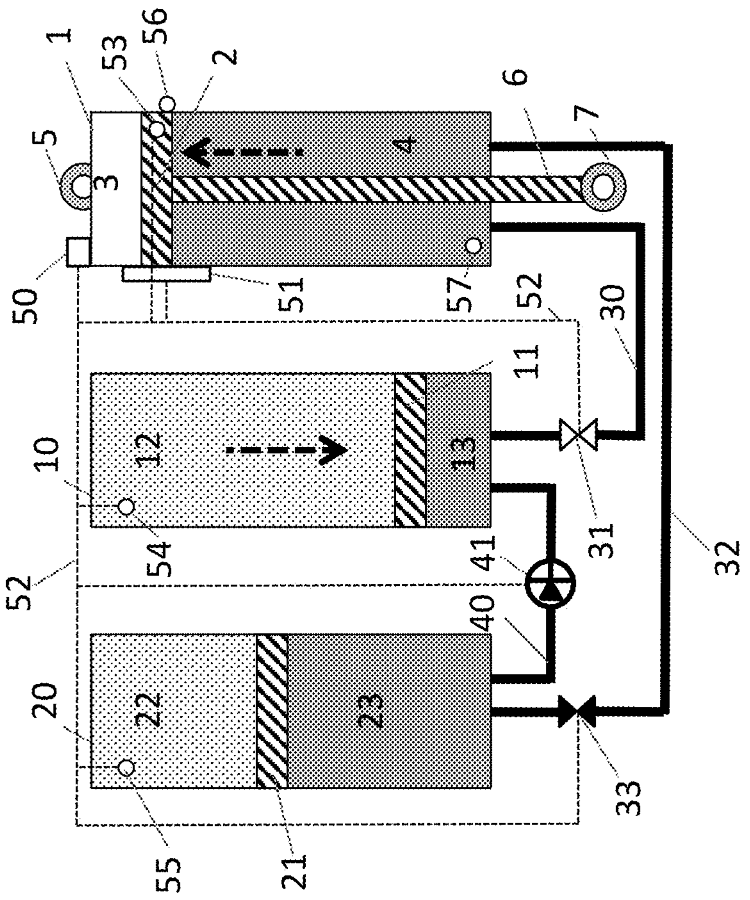
FIG. 2 is a cut-view drawing as seen from the side schematically illustrating the same example embodiment as in FIG. 1 during commencement of a quick-lift.

FIG. 2 illustrates the example embodiment shown in FIG. 1 during execution of the Quick Lift Module. In this phase, the first valve 31 is opened to allow the relatively high pressurised gas in the third chamber to press down the second piston 11 and the second valve 33 is closed to disengage the lowering accumulator 20 and force the hydraulic liquid being pressed out of the lifting accumulator 10 to enter the second chamber 4 of the main hydraulic cylinder 1 and create a return stroke. This makes the second piston 11 to move downwards and the first piston 2 to move upwards as indicated by the stapled arrows.

FIG. 3 *a*) illustrates the same example embodiment early in the execution of the Prepare for Heave Compensation Module, i.e. when the first piston 2 is lowered to a position in the middle of the main hydraulic cylinder 1 by utilising the weight of the suspended load. In this phase, the first valve 31 is closed and the second valve 33 is opened to allow the hydraulic fluid exiting the main hydraulic cylinder to enter the lowering accumulator 20. FIG. 3 *b*) illustrates the next step phase in the execution of the Prepare for Heave Compensation Module when the second valve 33 is closed to prevent the main piston 2 to be lowered below the middle of the main hydraulic cylinder and the pump 41 is engaged to transfer hydraulic liquid from the lowering accumulator 20 to the lifting accumulator 10 until the hydraulic liquid is distributed equal between them and the heave compensator obtains a neutral state and puts the heave compensator in a mode ready for heave compensation functionality.

FIGS. 4 *a*) to 4 *c*) illustrate the same example embodiment after ending the execution of the Quick-lift Module and the Prepare for Heave Compensation Module and after initiating the Valve Regulation Program Module, the Heave Compensation Module, and the Pump Activation Module which puts the heave compensator into normal heave compensation mode.

FIG. 4 *a*) illustrates the example embodiment during counteraction of a downwardly directed heave movement (indicated by the white stapled arrow) which lowers the main hydraulic cylinder 1. To compensate for this heave movement, the first valve 31 is opened to allow hydraulic liquid flowing from the lifting accumulator 10 into the main hydraulic cylinder 1 and thus causing the first piston 2 make a return stroke as indicated by the thin stapled arrows.

FIG. 4 *b*) illustrates the same example embodiment during an upwardly heave movement hoisting the main hydraulic cylinder 1. Now, the second valve 33 is closed to disengage the lifting accumulator 10 while the first valve 31 is opened to enable hydraulic liquid flowing from the main hydraulic cylinder (1) and into the lowering accumulator 20 to cause the first piston 2 to make an extension stroke as indicated by the thin stapled black arrows.

FIG. 4 *c*) illustrates the same example embodiment during execution of the Pump Activation Module to restore a "balanced" distribution of the hydraulic liquid between the lowering 20 and lifting 10 accumulator. The Pump Activation Module may engage the pump 41 at any time except when the first valve 31 is open, since an open first valve 31 would cause hydraulic liquid pumped by pump 41 into the fourth chamber 13 to immediately exit through the conduit 30.

Verification of the Invention

The invention will be described further by way of a simulation of the heave compensating functionality of the example embodiment described above and shown in FIGS. 4 *a*) to 4 *c*) during a lift of a load having a mass of 75 tons which is subject to a heave movement of 0.5 metres amplitude and a frequency of 1/12 seconds.

In this embodiment, the maximum stroke length of the main hydraulic cylinder is 0.6 metres, i.e. the length of the inner chamber of the single acting piston cylinder is 1.2 metres. The inner diameter of the main hydraulic cylinder is 28 cm such that when subject to this heave movement, the amount of hydraulic liquid in the main hydraulic cylinder within a 12 second period varies between almost 60 litres to about 5 litres as may be seen from a diagram of FIG. 5.

The load induced hydrostatic pressure, $p_1$, in the hydraulic oil resulting of a 75 ton payload is approx. 280 bar, with the current configuration. The lifting accumulator was preloaded with an adapted amount of gas to obtain a pre-set gas pressure, $sp_2$, in the lifting accumulator of 300 bar, while the lowering accumulator was preloaded with an adapted amount of gas to obtain a pre-set gas pressure, $sp_3$, in the lowering accumulator of 260 bar. Thus, the hydraulic pump had to work against a pressure difference of 40-50 bar, as compared to 280 bar if the pump should work against the full weight of the load.

The calculated movement of the piston rod 6 and the suspended load with a given cyclic heave movement affecting the crane tip is given in FIG. 5. The figure gives both calculated positions and velocities for the piston rod 6, the load and the crane tip, as well as calculated fluid balance between the main hydraulic cylinder and the lifting and lowering accumulators. They are marked as "Cylinder", "High" and "Low" on the figure, respectively. As seen on the figure, the piston rod moves in counterphase to the crane tip such that the suspended load is not or only to a small degree affected by the heave movements.

The figure also gives calculated pressures in the main hydraulic cylinder and the lifting and lowering accumulators. The vertical line marked with A inside a ring indicates a phase where the lift is affected by a downwardly heave movement, while the vertical line marked with B inside a ring indicates a phase where the lift is affected by an upwardly heave movement.

LIST OF REFERENCE SIGNS

1 main hydraulic cylinder
2 first piston
3 first chamber
4 second chamber
5 first connection device
6 piston rod
7 second connection device
10 lifting accumulator
11 second piston
12 third chamber
13 fourth chamber
20 lowering accumulator
21 third piston
22 fifth chamber
23 sixth chamber
30 first liquid conduit
31 first actuator controlled valve
32 second liquid conduit
33 second actuator controlled valve
40 third liquid conduit
41 actuator controlled pump
50 logical controller unit
51 motion sensing unit
52 signal transferring lines
53 first position sensor
54 first pressure and temperature sensor
55 second pressure and temperature sensor
56 third pressure sensor
57 fourth pressure sensor
58 second position sensor
59 third position sensor

The invention claimed is:

1. A heave compensator, comprising:

a main hydraulic cylinder comprising a first connection device located at an upper end of the main hydraulic cylinder and a first piston having a piston rod, where the interior of the main hydraulic cylinder is divided by the first piston into an upper first chamber and a lower second chamber, wherein the lower second chamber is filled with hydraulic liquid, and where the piston rod has a second connection device located at a lower end of the piston rod, a lifting accumulator comprising a second piston dividing the interior of the lifting accumulator into a third chamber filled with gas and a fourth chamber filled with hydraulic liquid, wherein the fourth chamber is fluidly connected to the lower second chamber by a first liquid conduit having a first actuator controlled valve regulating a flow of hydraulic liquid in the first liquid conduit, a lowering accumulator comprising a third piston dividing the interior of the lowering accumulator into a fifth chamber filled with gas and a sixth chamber filled with hydraulic liquid, wherein the sixth chamber is fluidly connected to the lower second chamber by a second liquid conduit having a second actuator controlled valve regulating the flow of hydraulic liquid in the second liquid conduit, wherein the sixth chamber is fluidly connected to the fourth chamber by a third hydraulic liquid conduit comprising an actuator controlled pump unidirectionally regulating the flow of hydraulic liquid from the sixth chamber to the fourth chamber, and the heave compensator further comprises:

a sensor kit comprising a motion sensing unit registering vertical movements of the main hydraulic cylinder, a logic control unit comprising a processor loaded with a Valve Regulation Module containing logic commands which, when executed, controls and regulates the actuator of the first actuator controlled valve, the actuator of the second actuator controlled valve, and the actuator of the actuator controlled pump, and signal transferring lines electronically connecting the logic control unit to the motion sensing unit of the sensor kit, the actuators of the first and the second actuator controlled valves, and the actuator of the actuator controlled pump.

2. The heave compensator according to claim 1, wherein the first and the second actuator controlled valves are throttle valves, dampening valves, or proportional valves which continuously regulate a cross-section of the first or the second liquid conduit, respectively, from zero to 100% opening, and wherein the actuator of the actuator controlled pump is an electric motor.

3. The heave compensator according to claim 1, wherein the logic control unit is either a Proportional-Integral-Derivative (PID)-controller, a feed-forward controller, a fuzzy logical controller, a process-model based controller, or a combination thereof, and the motion sensing unit is an inertial measurement unit with single- or multi-axis Micro-Electro-Mechanical Systems (MEMS) gyroscope based motion sensors.

4. The heave compensator according to claim 3, wherein the sensor kit further comprises a first position sensor registering the position of the first piston of the main hydraulic cylinder.

5. The heave compensator according to claim 4, wherein the Valve Regulation Module of the logic control unit further comprises a Heave Compensation Module containing logic commands, which, when executed, utilises sensor data from the motion sensing unit to determine a vertical velocity component, $v_{heave}$, of a heave movement affecting the main hydraulic cylinder, and further utilises sensor data from the first position sensor to determine the velocity, $v_{pist1}$, of the piston of the main hydraulic cylinder, and then engages the actuator of the first actuator controlled valve and the actuator of the second actuator controlled valve to regulate the movement of the first piston of the main hydraulic cylinder such as to satisfy the relation: $|v_{heave}+v_{pist1}|=0$.

6. The heave compensator according to claim 5, wherein the regulation of the movement of the first piston of the main hydraulic cylinder is obtained by adjusting the opening of the respective actuator controlled valve of the respective liquid conduit of the lowering or lifting accumulator being engaged to move the first piston.

7. The heave compensator according to claim 5, wherein the processor of the logic control unit further comprises a Pump Activation Module containing logic commands, which, when executed, applies sensor data from the second pressure and temperature sensor to engage the actuator controlled pump whenever the measured gas pressure, $p_3$, in the fifth chamber becomes higher than $1.2 \cdot sp_3$, preferably higher than $1.15 \cdot sp_3$, more preferably higher than $1.1 \cdot sp_3$, and most preferably higher than $1.05 \cdot sp_3$, and to disengage the actuator controlled pump whenever the measured gas pressure in the fifth chamber becomes lower than $0.8 \cdot sp_3$, preferably lower than $0.85 \cdot sp_3$, more preferably lower than $0.9 \cdot sp_3$, and most preferably lower than $0.95 \cdot sp_3$, where $sp_3$ is a set point pressure of the gas being preloaded into the fifth chamber prior to a lifting operation.

8. The heave compensator according to claim 5, wherein the processor of the logic control unit further comprises a Pump Activation Module containing logic commands, which, when executed, applies sensor data from the first pressure and temperature sensor and the second pressure and temperature sensor to regulate the revolutions per minute of the actuator controlled pump to minimise an error function $e=\max(ep_2, ep_3, 0)$, where $ep_2=sp_2-p_2$, $ep_3=p_3-sp_3$, $sp_2$ is the set point gas pressure, i.e. the set point pressure, in the third chamber of the lifting accumulator, $sp_3$ is the set point gas pressure in the fifth chamber of the lowering accumulator, $p_2$ is the measured gas pressure by the first pressure and temperature sensor in the third chamber of the lifting accumulator, $p_3$ is the measured gas pressure by the second pressure and temperature sensor in the fifth chamber of the lowering accumulator, and which stops the actuator controlled pump if the error function returns the value 0 when both $ep_2$ and $ep_3$ are negative.

9. The heave compensator according to claim 5, wherein the processor of the logic control unit further comprises a Quick Lift Module containing logic commands, which, when executed, cause the Valve Regulation Module to initially close the first actuator controlled valve and open the second actuator controlled valve, and then when the quick lift is to be executed, close the second actuator controlled valve and fully open the first actuator controlled valve.

10. The heave compensator according to claim 5, wherein the processor of the logic control unit further comprises a Quick Lift Module containing logic commands, which, when executed, causes the Valve Regulation Module to automatically prepare the heave compensator for a quick-lift by, in successive order:

closing, if open, the first actuator controlled valve and opening the second actuator controlled valve, applying the registered temperature and pressure data from the first pressure and temperature sensor and/or position data from a second position sensor to determine a measured volume, $V_{meas}$, of hydraulic liquid present in the lifting accumulator, and if $V_{meas}<V_{int}$, where $V_{int}$ is a desired initial volume of hydraulic liquid in the lifting accumulator (10):

engaging the actuator controlled pump to transfer hydraulic liquid from the sixth chamber of the lowering accumulator to the fourth chamber of the lifting accumulator, and applying the registered position data from the second position sensor to disengage the actuator controlled pump when $V_{meas} \geq V_{int}$, or else:

closing the second actuator controlled valve, and then, when the quick-lift is to be executed:

fully opening the first actuator controlled valve.

11. The heave compensator according to claim 10, wherein the Quick Lift Module further comprises a Prepare for Heave Compensation Module to be engaged after the quick-lift is commenced, and which contains logic commands which, when executed, performs in successive order:

closes the first actuator controlled valve, applies position data from the first position sensor to continuously determine the position of the first piston, opens the second actuator controlled valve to enable the weight of the suspended load to controllably extend the first piston until it reaches a position at the middle length of the main hydraulic cylinder and then closes the second actuator controlled valve, engages a Pump Activation Module to transfer hydraulic liquid from the lowering accumulator to the lifting accumulator, and then engages the Heave Compensation Module.

12. The heave compensator according to claim 1, wherein the third chamber of the lifting accumulator is preloaded with an amount of gas giving a set point gas pressure, $sp_2$, which ensures that the gas pressure inside the third chamber is larger than $p_1$ for any position of the second piston, and the fifth chamber of the lowering accumulator is preloaded with an amount of gas giving a set point gas pressure, $sp_3$, which ensures that the gas pressure inside the fifth chamber is smaller than $p_1$ for any position of the third piston, where $p_1$ is a load induced hydrostatic pressure of the hydraulic liquid in the lower second chamber when a load intended to be lifted is suspended from the second connection device.

13. The heave compensator according to claim 1, wherein the sensor kit further comprises a first pressure and temperature sensor located in and registering the gas pressure, $p_2$, inside the third chamber of the lifting accumulator, and a second pressure and temperature sensor located in and registering the gas pressure, $p_3$, inside the fifth chamber of the lowering accumulator.

14. The heave compensator according to claim 13, wherein the heave compensator further comprises an electric battery for supplying electric energy to the logic control unit, the sensor kit, and the respective actuators of the first actuator controlled valve, the second actuator controlled valve, and the actuator controlled pump.

15. The heave compensator according to claim 1, wherein the amount of hydraulic liquid in the heave compensator is adapted such that when hydraulic liquid is distributed equally between the second, fourth, and the sixth chamber, that the first, second, and the third piston, are positioned in the middle of the main hydraulic cylinder, the lifting accumulator, and the lowering accumulator, respectively.

* * * * *